Inventor
Roy H. Benton
By Robert M. Dunning
Attorney

Patented May 16, 1944

2,349,133

UNITED STATES PATENT OFFICE 2,349,133

CIRCULAR SAW DEVICE

Roy H. Benton, South St. Paul, Minn.

Application September 5, 1942, Serial No. 457,430

9 Claims. (Cl. 143—48)

My invention relates to an improvement in circular saw device, wherein it is desired to provide a circular saw apparatus which may be easily loaded and operated.

In the use of circular saws two problems of considerable importance often arise. In the first place it is difficult to mount the logs or other material upon the saw for cutting the same. In the second place it is difficult to provide a saw which will cut the material into the proper lengths without wasting considerable time.

It is the object of the present invention to provide a circular saw device which is equipped with a means of facilitating the loading of the saw table. It is further a purpose of the present invention to provide an apparatus by means of which the material being cut may be measured into the length desired. This apparatus comprises a carriage designed to engage the material to be cut and to move the same longitudinally along the saw table.

An object of the present invention resides in the provision of a circular saw having a slidable or rockable saw table equipped with a means for moving the log or other material to be cut longitudinally thereover. This means includes a lever mounted at one end upon a pulley or carriage which is reciprocable on a track on the saw table. By means of this track the carriage and lever may be moved slidably along the saw table to pull the material to be cut longitudinally along the same. As a result the movement of the material to be cut along the saw table into position for the next cut is greatly facilitated.

A further feature of the present invention lies in the fact that the lever means which is engageable with the material to be cut, to move this material along the saw table, is so mounted that the length of material cut off may be easily regulated. In cutting logs or wood for firewood or kindling, it is usually desirable to cut the material in some fixed length, such as twelve inches, fifteen inches, or eighteen inches. By means of the log moving lever and its associated mechanism the length of piece cut from the log or other material may be accurately measured.

A further feature of the present invention lies in the provision of a saw table which is arranged with transverse slots therein at fixed predetermined distances apart. These slots cooperate with the lever used to lift the log and to pull the same longitudinally along the table. When this operating lever is in lowered position it is entirely beneath the level of the saw table and longitudinal movement of the lever will not affect the log upon the table. However, by raising the lever while the same is in registry with one spaced slot in the saw table, the lever is brought into engagement with the lower surface of the log and may be operated to lift the log. The lever may then be moved longitudinally of the table to move the log along the saw table. After the log has been moved a predetermined distance the lever may be dropped into another slot in the saw table, spaced the required distance from the first slot. Thus the spacing of the slots regulates the length of movement of the log.

A further feature of the present invention lies in the provision of a means for holding the log firmly upon the saw table. This means comprises a lever pivoted to the first named lever and designed to extend over the upper surface of the log on the table. Thus one lever may engage the lower surface of the log, while the other lever engages the upper surface thereof. The log is securely clamped between the two levers.

A further feature of the present invention resides in the provision of a means for elevating the end of a log onto the saw table. This end of the log is pulled onto a pivoted frame at one end of the saw table. The frame is then pivoted upwardly, raising the log end. This frame, when locked in elevated position, acts as a support to the log during the cutting operation.

These and other objects and novel features of my invention will be more clearly and fully set forth in the following specification and claims.

In the drawing forming a part of my specification:

Figures 1, 2, 3, 4, 5, 6:
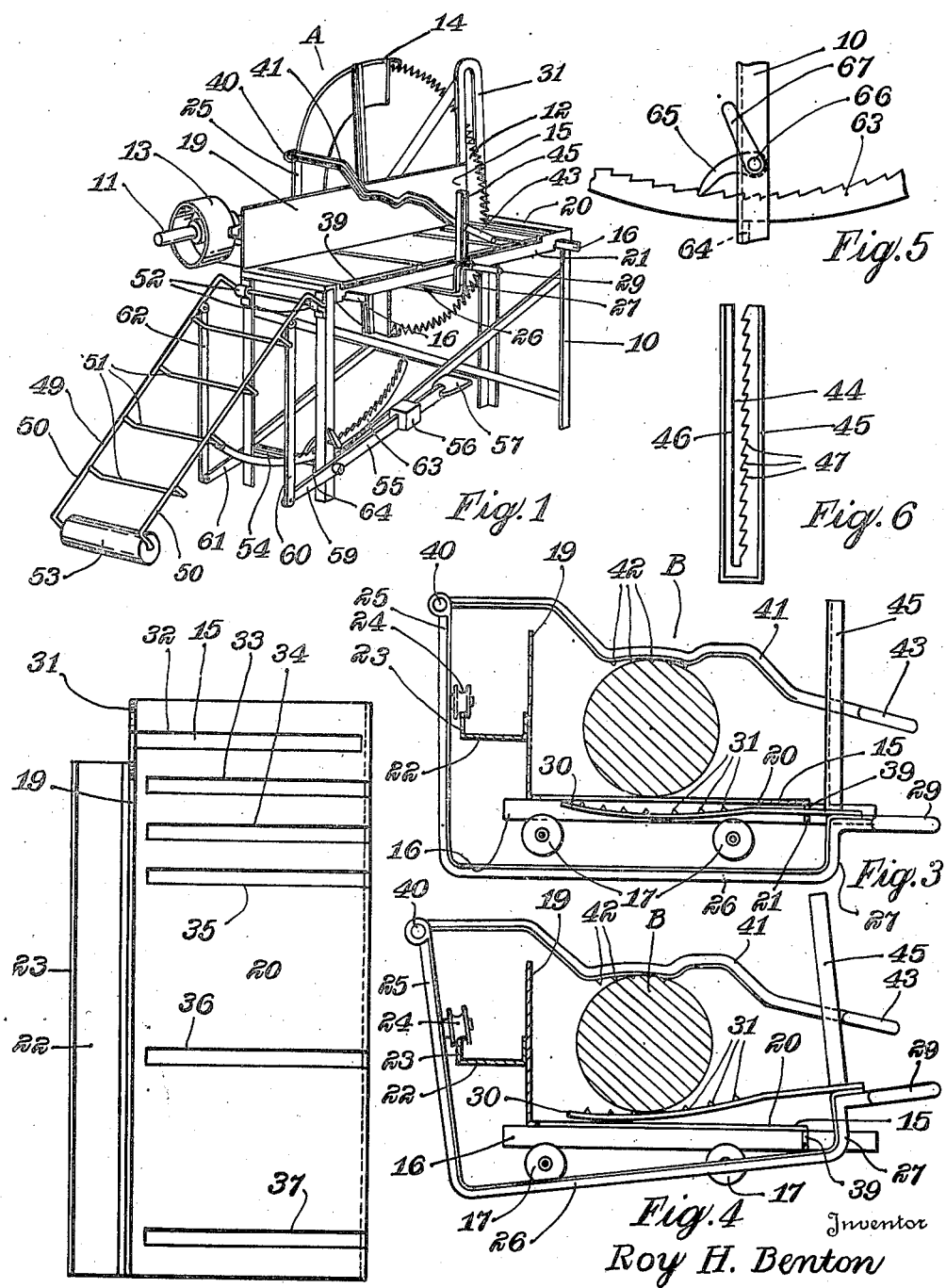
Figure 1 is a perspective view of my circular saw device showing the construction thereof.
Figure 2 is a top plan view of the saw table used in conjunction with my device.
Figure 3 is a diagrammatic side elevational view of the saw table showing the movable carriage for moving the material to be cut longitudinally of the saw table.
Figure 4 is a view similar to Figure 3 showing a different position of the parts.
Figure 5 is a detail view showing the manner of operation of the means for holding the material elevating means in elevated position.
Figure 6 is an elevational view of a detailed part of the movable carriage.

The saw device A includes in general a supporting frame 10 which is braced in any suitable manner and which supports a shaft 11 upon which is mounted the circular saw 12. The means supporting the shaft and saw are not illustrated in detail, it being understood that saws such as 12 and shafts such as 11 have been previously mounted upon supporting bases such as 10, and there is nothing new about this specific arrangement. A pulley 13 may be provided on the shaft 11 by means of which the shaft 11 and saw 12 may be rotated.

A guard 14 of any suitable type may partially enclose the saw 12 so as to add protection for the saw operator. The guard 14 also forms a part of the supporting base.

A table 15 is slidably or tiltably mounted upon the base 10. For the purpose of illustration the table 15 is shown with tracks 16 attached thereto which may slide on rollers such as 17. Obviously the tracks and rollers must be so arranged that the table can not be merely lifted from the rollers 17, but this construction is not shown in detail, as it is common construction on devices of this sort.

The table 15 is provided with a vertical wall 19 and a horizontally extending table top portion 20. At the front end of this table top portion 20, I provide a short depending flange 21 forming a part of the table. The purpose for this arrangement will be more clearly described.

A channel 22 is shown secured to the wall 19 of the table 15. One flange 23 of this channel 22 forms a track for supporting the roller or pulley 24. In preferred form a pair of spaced pulleys 24 are provided to ride upon the track flange 23 so as to prevent tilting of the carriage in one direction.

The pulleys or rollers 24 are pivotally mounted upon the upwardly extending end 25 of the carriage lever 26. This carriage lever 26 extends beneath the table 15, as best illustrated in Figures 1, 3, and 4 of the drawing and extends upwardly at the forward end 27, terminating in a forwardly projecting handle end 29. Thus the lever 26 may be moved longitudinally of the table. The rollers 24 on the lever rotating over the flange 23 of the track 22.

Secured to the lever 26 near the handle end thereof, I provide a bar 30 having a series of upwardly projecting teeth 31 thereupon. This bar 30 is designed to engage the lower surface of a log, such as B, or other material to be cut, so as to move this log or other material longitudinally along the saw table. The bar 30 engages beneath the log B, as best illustrated in Figure 4, and raises the log enabling the same to be pulled longitudinally of the table by means of the carriage lever 26.

The table 15 is provided with transverse slots therein through which the bar 30 may drop. These slots are a fixed distance from the saw 12, which is designed to extend in the slot 32 near one end of the table 15. As the slot 32 extends most of the distance through the table top a U-shaped reinforcement 31 is provided extending upwardly from the table to reinforce the same on opposite sides of the slot. The saw 12 extends through this U-shaped support.

One slot 33 is formed in the table near the end thereof through which the saw extends. At a distance of, for example, three inches from the slot 33, I provide a second slot 34, at a distance of perhaps three inches from the slot 34 I provide a third slot 35. A fourth slot 36 may extend through the table at a point perhaps twelve inches from the slot 35. A slot 37 may be provided in the table at a point perhaps twelve inches from the slot 36. The purpose for these slots and the spacing thereof is to provide predetermined lengths of cut of the log or other material to be cut, as will be later described.

The slots 33, 34, 35, 36, and 37 extend from a point spaced from the vertical wall 19 to the forward edge of the table top 20 and downwardly a short distance into the forwarded flange 21 of the table 15. A longitudinally extending slot 39 is provided in the flange 21 which extends all the way from the slot 33 to the slot 37, connecting all of the slots. As a result the carriage may be operated in the following manner.

When the log is introduced onto the table the carriage lever 26 is in the lowered position illustrated in Figure 3 of the drawing with the bar 30 extending entirely beneath the surface of the table. The log is moved either by the lever or by any suitable means until the end of the log is opposite the saw 12. The next problem is to move the log or material to be cut a predetermined distance from this point so as to provide a cut-off end of predetermined length.

If the cut-off portion is to be twelve inches long the carriage lever 26 may be moved until the bar 30 is in registry with the slot 37. The lever 26 is then tilted, as illustrated in Figure 4, the bar 30 engaging the lower surface of the log and raising the same. By pulling on the lever handle 29 the log may be moved with the carriage until the bar 30 is in registry with the slot 36. The lever 26 may then be lowered, the bar 30 extending through the slot 36 out of engagement with the log. As the slots 36 and 37 are twelve inches apart, the log will have been moved a similar distance. If it is more convenient the lever could be elevated through the slot 36 and lowered through the slot 35, as these slots are also twelve inches apart.

If a length of log fifteen inches long is to be cut off, the bar 30 may be elevated through the slot 36 and the lever and log may be moved longitudinally until the bar 30 is in registry with the slot 34. As the slots 34 and 35 are three inches apart and the slots 35 and 36 are twelve inches apart a total length of fifteen inches will then be cut off. If an eighteen inch cut-off section is desired, the bar 30 may be raised through the slot 36 and dropped through the slot 33, these slots being eighteen inches apart. In any event, after the cutting action the carriage lever may be returned to any desired starting position, the bar 30 sliding through the slot 39 beneath the top 20 of the table 15.

With the type of table described and illustrated, lengths of logs of three inches, six inches, twelve inches, fifteen inches, eighteen inches, twenty-four inches, twenty-seven, or thirty inches may be obtained with a single movement of the carriage lever. Other combinations of lengths may be attained by other movements of the carriage lever. Obviously the slots 33 through 37 may be positioned in such a way to obtain any combination of log lengths by movement of the carriage from one slot to another.

In order to more firmly hold the log on the table during the sawing operation and to more firmly clamp the log during the movement of the carriage lever, I may extend the end portion 25 of the lever 26 upwardly above the level of the wall portion 19 of the table 15, and pivotally attach to the end 40 a clamping lever 41. This clamping lever 41 is shaped to engage the upper surface of a log or other material to be cut, and teeth 42 may be provided if it is found necessary or desirable. The forward end of the lever 41 is provided with a handle 43, by means of which the lever may be operated, and the lever may be held in any adjusted position by engagement in the tooth slot 44 of the vertically extending channel 45 mounted on the lever 26 near the handle end 29 thereof.

The toothed slot 44 may be best noted in Figure 6 of the drawing. This slot is smooth along one side 46 thereof, and is provided with a toothed edge 47 along the opposite side of the slot. The lever 41 may engage in any of the teeth 47 to hold the lever 41 clamped against the log B. In Figure 3 of the drawing the lever 43 is shown clamping the log against the saw table 15. In Figure 4 of the drawing the lever 41 is shown clamping the log B against the bar 30 in elevated position of the lever 26. When the log is held between the bar 30 of the lever 26 and the lever 41, little or no slippage can take place between the log and these levers during longitudinal movement.

In order to assist the operator in moving the log upon the table, I may provide an elevating device, best illustrated in Figure 1 of the drawing. This device comprises a ladder-like frame 49 including a pair of spaced side rails 50 connected by channel-shaped connecting elements 51. The upper end of the frame 49 is pivotally mounted in journals 52 on the end of the frame 10. The other end of the frame 49 is preferably provided with a roller 53 which acts to support the weight of the log in elevated position of the frame.

A shaft 54 extends transversely of the frame 10. A lever 55 is mounted on the shaft 54 to rotate therewith. A counterweight 56 may be provided on one end of the lever 55 to assist in operating the elevating frame, and a foot pedal end 57 may be provided on this same end of the lever.

The other end 59 of the lever 55 is connected by a link 60 to the frame 49. An arm 61 on the shaft 54 is connected by a link 62 to the other side of the frame 49. By pressing downwardly on the foot pedal end 57 the links 60 and 62 urge the frame 49 upwardly pivoting the same in the journals 52.

An arcuated rack 63 is pivotally secured at one end to the frame 49 and rides upon a transverse cross member 64 on the frame 10. As best illustrated in Figure 5 of the drawing, a dog 65 is pivotally mounted on a shaft 66 extending through one of the legs of the frame 10, and an operating lever 67 is provided for pivoting the dog 65 into or out of engagement with the rack 63. This dog 65 engages the rack 63 to hold the elevating frame 49 in elevated position. This frame may be released and dropped by operation of the lever 67, which removes the dog 65 from engagement with the rack.

In accordance with the patent statutes, I have described the principles of construction and operation of my circular saw device, and while I have endeavored to set forth the best embodiment thereof, I desire to have it understood that obvious changes may be made within the scope of the following claims without departing from the spirit of my invention.

I claim:

1. A circular saw device comprising a saw, a saw table movable transversely toward and away from said saw, a lever carriage movable longitudinally of said table to move material to be cut longitudinally thereof, means on said lever carriage normally positioned below the level of the table, and a series of slots in said table through which said means on said lever carriage may extend into engagement with material on the table to lift the material and move it longitudinally of the table.

2. A circular saw device comprising a circular saw, a table movable transversely toward and away from said saw, a lever carriage for moving material longitudinally of said table, said lever carriage being movable longitudinally of said table, and slot means in said table so arranged that said lever carriage may move either above said table or below the surface thereof.

3. A circular saw device comprising a circular saw, a table movable transversely toward and away from said saw, a lever mounted for movement longitudinally of said table and extending beneath said table, an arm on said lever extending beneath said table, and slots in said table so arranged that said arm may swing upwardly through said slots into engagement with material on said table to lift the material and move it longitudinally of the table.

4. A circular saw device including a circular saw, a table transversely movable toward and away from said saw, a carriage movable longitudinally of said table, a lever on said carriage extending under said table and projecting to the forward end of said table, an arm on said lever extending through a longitudinal slot in said table, and transversely extending slots in communication with said longitudinally extending slot through which said arm may be moved into engagement with material on said table.

5. A circular saw device comprising a circular saw, a table movable transversely toward or away from said saw, a carriage slidable longitudinally of said table, said carriage including means engageable with the lower surface of material on said table and slidable with said carriage longitudinally of said table, said table including means gauging the length of movement of said last named means.

6. A circular saw device comprising a circular saw, a saw table movable transversely with respect to said saw toward or away from said saw, a carriage movable longitudinally of said table, a lever on said carriage engageable with the lower surface of material on said table to move the same longitudinally of said table, and a second lever pivotally secured to said first named lever and designed to engage the upper surface of material on said table.

7. A circular saw device comprising a circular saw, a table transversely movable with respect to said saw, a carriage movable longitudinally of said table, a lever on said carriage engageable with the lower surface of material on said table, a second lever on said carriage engageable with the upper surface of material on said table, and means for holding said levers in clamped relation to clamp the material to be sawed therebetween.

8. A circular saw device comprising a circular saw, a table movable transversely toward or away from said saw, a carriage movable longitudinally of said table, a lever on said carriage engageable with the lower surface of material on the table, slots in said table to permit said lever to move either over or under said table, and a clamping lever pivotally secured to said carriage and designed to extend in clamping relation with said first named lever.

9. A circular saw device comprising a circular saw, a table movable transversely toward or away from said saw, a track mounted longitudinally of said table, and lever means engageable with material on the table to lift the same and move the same longitudinally, said lever means including roller means engageable with said track.

ROY H. BENTON.